United States Patent [19]
Burgard

[11] Patent Number: 5,784,013
[45] Date of Patent: Jul. 21, 1998

[54] CIRCUIT FOR REMOVING ENERGY DISPERSAL IN A DATA TRANSMISSION

[75] Inventor: Francine Burgard, Grenoble, France

[73] Assignee: SGS-Thomson Microelectronics S.A., Saint Genis, France

[21] Appl. No.: 755,197

[22] Filed: Nov. 25, 1996

[30] Foreign Application Priority Data

Nov. 30, 1995 [FR] France .................... 95 14383

[51] Int. Cl.[6] .................... H03M 9/00
[52] U.S. Cl. .................... 341/100; 341/101
[58] Field of Search .................... 341/100, 101; 380/28, 44, 49, 50

[56] References Cited

U.S. PATENT DOCUMENTS

| | | | |
|---|---|---|---|
| 5,163,092 | 11/1992 | McNesby et al. | 380/28 |
| 5,185,799 | 2/1993 | McNesby et al. | 380/28 |
| 5,241,602 | 8/1993 | Lee et al. | 380/44 |
| 5,258,987 | 11/1993 | Wei | 371/43 |
| 5,278,906 | 1/1994 | Boly et al. | 380/48 |

OTHER PUBLICATIONS

French Search Report from French Patent Application 95 14383, filed Nov. 30, 1995.

*Primary Examiner*—Brian K. Young
*Attorney, Agent, or Firm*—Wolf, Greenfield & Sacks, P.C.

[57] ABSTRACT

The present invention relates to a circuit for removing energy dispersal in the transmission of a data packet, the circuit including a polynomial counter for supplying, at the transmission rate of the bits of the packet, correction bits to be respectively X-ORed with the bits of the packet. The correction bits are supplied to a series-to-parallel converter having its output combined with the successive packet parallel transmitted bits of the packet.

18 Claims, 2 Drawing Sheets

CIRCUIT FOR REMOVING ENERGY DISPERSAL IN A DATA TRANSMISSION

BACKGROUND OF THE INVENTION

1. Field of the Invention

The present invention relates to a data processing chain for reducing the number of errors in a transmission. The invention more particularly relates to one element of the chain which is a circuit for removing energy dispersal, also called "de-scrambler" circuit.

2. Discussion of the Related Art

FIG. 1 shows an example of a processing chain used at the level of a receiver conforming to the European standard for satellite digital television signal transmission. According to this standard, the digital data are transmitted by packets of bytes, generally packets of 204 bytes, 16 bytes of which are redundant and are used for error correction. The limits of the packets are determined by synchronization codes.

Each packet is submitted, upon transmission, to a scrambling device which serves to reduce the frequency spectrum of the transmission signal in order to make its processing easier. The scrambling device combines the bits of each packet by exclusive-ORing the bits with corresponding bits supplied by a polynomial counter initialized at a proper value.

Each packet is also submitted to an external coding (Reed-Solomon coding) which generates the above-mentioned redundant bytes to enable several errors in each packet to be corrected.

The bytes of each packet are interlaced in order to better correct bursts of consecutive errors. If several consecutive errors happen in the transmission, when the data has been disinterlaced, the errors of the burst will be found at isolated locations and will thus be easier to correct.

Eventually, the bits to be transmitted undergo an internal coding (convolutive coding) to create two redundant transmission signals I and Q which also serve to reduce the number of errors.

FIG. 1 shows part of the architecture according to the above-mentioned European standard of the inverse processing of signals I and Q. At 10, the signals I and Q are received and undergo an internal decoding (using the Viterbi algorithm). At 12, in the series signal 11 produced by decoder 10, synchronization words for delimiting the packets are detected and a series-to-parallel conversion is performed to supply bytes. In consecutive blocks 14, 16 and 18, the disinterlacing, the external decoding and the descrambling are respectively performed.

It should be noted that the architecture of FIG. 1 operates at two different frequencies. A first portion, that is, internal decoding circuit 10 and part of synchronizing and series-to-parallel converting circuit 12, is clocked by a fast clock CK at the bit transmission frequency, while the rest of the architecture is clocked by a slower clock CK/8 at the byte transmission frequency.

Generally, the bit transmission frequency is at the limit of what can be obtained with current technologies. Thus, the circuits which operate at this frequency have to be implemented with special care to minimize the clock edge delays and to compensate for these delays in order to bypass synchronization problems. These problems are not encountered in the other circuits operating at a lower frequency (CK/8).

FIG. 2 shows a conventional descrambler. This circuit includes a polynomial counter constituted by a shift register 20, the input of which receives an exclusive-OR combination 22 of the output of the shift register and of one or several intermediary flip-flops of this shift register. Shift register 20 is clocked by bit clock CK and receives an initial value at the beginning of each group of eight packets to be processed. The beginning of the groups of packets is determined by a group synchronization signal SYNC. In the context of the above-mentioned European standard, shift register 20 includes fifteen flip-flops and the input of the register receives the X-OR combination of the outputs of the last two flip-flops. The initialization value is 100101010000000.

The output of X-OR gate 22, constituting the output of the polynomial counter, supplies correction bits c to a first input of an X-OR gate 24, at the bit transmission rate. The bits b of the scrambled packets are supplied to a second input of X-OR gate 24. The output of X-OR gate 24 supplies the bits b' of the descrambled packets.

The circuit of FIG. 2, which is particularly simple, is meant to operate on a series transmission of bits b. In order to allow the descrambler 18 of the architecture of FIG. 1 to work on a parallel byte transmission, two solutions could be considered.

A first solution consists of using parallel arithmetics operating over bytes. The resulting circuit, with a parallel structure, would be complex and would occupy a significant area compared to the series circuit of FIG. 2.

A second solution consists of performing a series-to-parallel conversion at the output of external decoder 16 in order to be able to use, at 18, the series circuit of FIG. 2, and then to convert back to parallel the bits supplied in series by the circuit of FIG. 2. If the bit transmission speed was slow, this solution would be far less complex than the above-mentioned first solution. However, it is always difficult, in any circuit, to pass from a low operating frequency (at the parallel output of external decoder 16) to a high operating frequency (at the series input of the circuit of FIG. 2). The high frequency of the circuit of FIG. 2 has to be synchronized on the lower frequency of decoder 16. This synchronization does not raise any particular problem if the high frequency is far below the technological limits. However, if this high frequency is at the limit of what is accepted by the technology, the synchronization becomes particularly difficult and requires the use of complex solutions. Moreover, the synchronization solutions which would work well in a given technology will not necessarily work in another technology.

Conversely, a series-to-parallel conversion, such as performed at 12 in FIG. 1, does not raise any problem.

SUMMARY OF THE INVENTION

An object of the present invention is to provide a parallel operating descrambler which has a particularly simple structure and which can operate at the limit frequency of the technology used.

To achieve this object, the present invention provides a circuit which performs a series-to-parallel conversion of the correction bits supplied by a series polynomial counter. The correction bits are thus supplied to the bytes by the series-to-parallel converter and can be combined with the bytes of the packet by eight X-OR gates.

With this configuration, the transition from a low frequency to a high frequency, which raises synchronization problems, is avoided (as in a parallel-to-series converter).

The present invention more specifically provides a circuit for removing energy dispersal in transmitting a data packet, including a polynomial counter supplying, at the transmission rate of the bits of the packet, correction bits to be respectively X-ORed with the bits of the packet. The correction bits are supplied to a series-to-parallel converter having its output combined with the successive parallel transmitted bits of the packet.

According to an embodiment of the present invention, the polynomial counter is initialized at the beginning of a packet.

According to an embodiment of the present invention, the circuit for removing energy dispersal is used in a packet processing chain upstream of a packet synchronization word detector and of a series-to-parallel converter of the transmission of the bits of the packet, the polynomial counter receiving an initialization signal delayed, with respect to a synchronization detector, by the delay between a synchronization detection and the occurrence of the beginning of a packet at the input of the circuit for removing energy dispersal.

These objects, features and advantages, as well as others, of the present invention will be discussed in detail in the following description of specific embodiments, taken in conjunction with the following drawings, but not limited by them.

DETAILED DESCRIPTION

Figure 1:
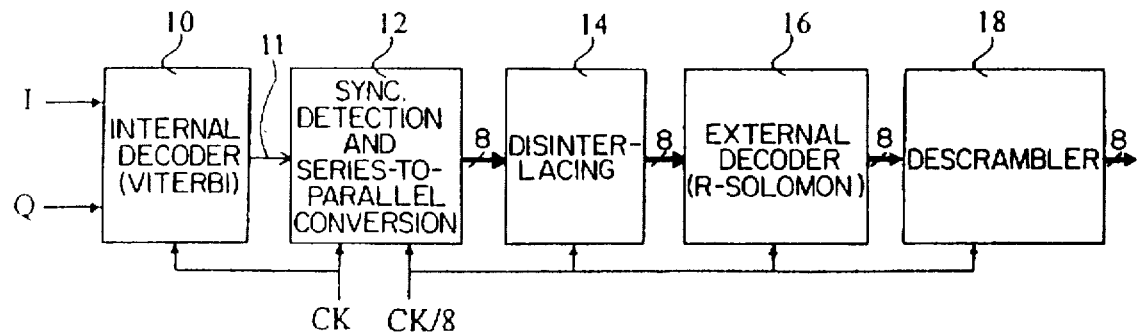
FIGS. 1 and 2, previously described, illustrate a prior art data processing chain.
Figure 2:
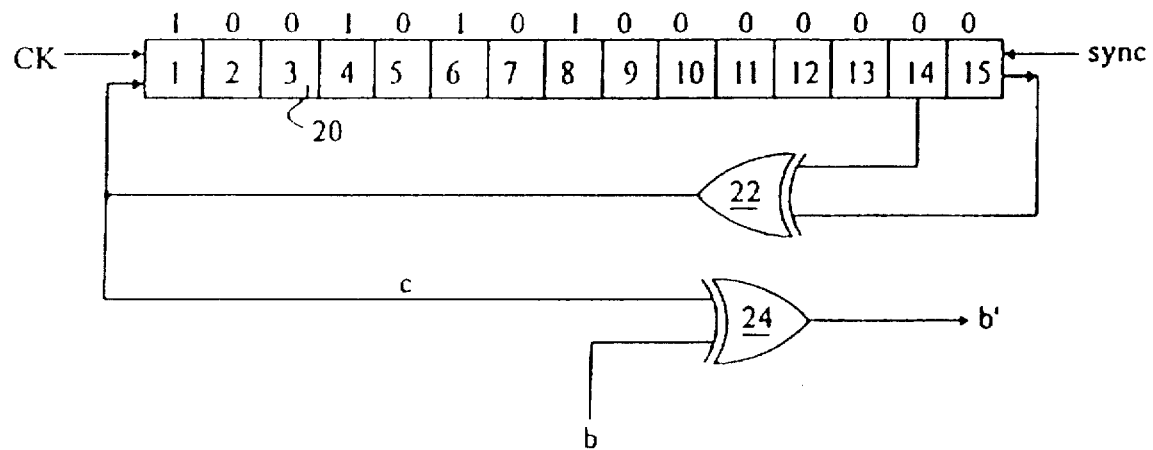
Figure 3:
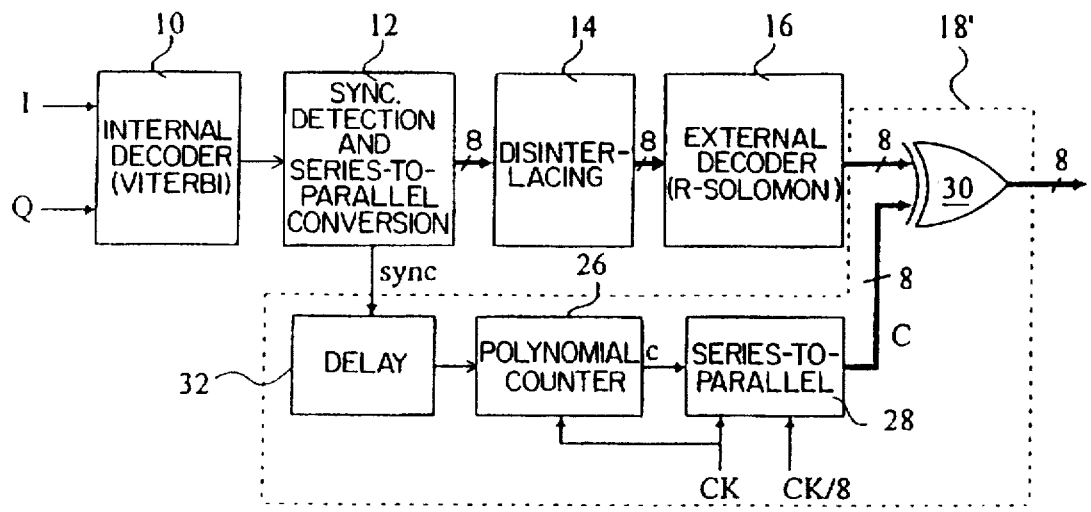
FIG. 3 shows an architecture of a data processing chain wherein a circuit for removing energy dispersal according to the present invention is incorporated.

FIG. 3 shows a data processing chain of the present invention in which the components which are included in the data processing chain of FIG. 1 are referred to by the same reference numerals. The bytes output by external decoder 16 are supplied to a circuit 18' for removing energy dispersal according to the present invention. This circuit 18' for removing energy dispersal includes a series polynomial counter 26, of the type shown in FIG. 2, supplying correction bits c at the bit transmission frequency (CK). The correction bits c are supplied to a series-to-parallel converter 28 which restores, from bits c, correction bytes C at the rate (CK/8) of the bytes supplied by decoder 16. The correction bytes C are combined at X-OR gate 30 by X-ORing them with the bytes output by decoder 16. The "de-scrambled" bytes are the result of these X-OR combinations at X-OR gate 30.

Polynomial counter 26 must be initialized synchronously with the arrival at the output of external decoder 16 of the beginning of a packet. The beginnings of packets are detected by synchronization detector 12 which activates a signal SYNC for each detection of a synchronization word defining the beginning of a packet. This signal SYNC is used to initialize polynomial counter 26, and is supplied thereto via a circuit 32 which delays signal SYNC so as to initialize polynomial counter 26 in correspondence with the occurrence of the beginning of an eight packet group at the output of external decoder 16. As the first byte of a packet appears at the output of decoder 16, series-to-parallel converter 28 must supply the corresponding correction byte C. For this purpose, polynomial counter 26 must have been initialized eight cycles of bit clock CK prior to the output of the corresponding correction byte C from polynomial counter 26.

A parallel circuit for removing energy dispersal according to the present invention occupies an area similar in size to that occupied by the series circuit of FIG. 2. Moreover, no parallel-to-series converter is used which, as has been previously explained, causes great problems due to the transition from a slow frequency (byte frequency) to a fast frequency (bit frequency) at the limit of what is acceptable by the technology used.

Generally, to synchronize the various circuits of the architecture of FIG. 1, a time base is provided which includes a packet counter initialized by synchronization circuit 12 at the beginning of each group of eight packets, and a byte counter initialized by synchronization circuit 12 at the beginning of a packet. Thus, the packet counter indicates the rank of a current byte in the current packet (a current byte being that which is supplied by series-to-parallel converter 12).

Delay device 32 imposes a delay by waiting until the packet and byte counters reach corresponding values as set forth below. In the context of the above-mentioned European standard, the packets to be processed include 204 bytes and the delay introduced by blocks 14 and 16 is of 1157 bytes. In this example, polynomial counter 26 is initialized when the packet and byte counters respectively reach the value 5 and the value 136.

Figure 4:
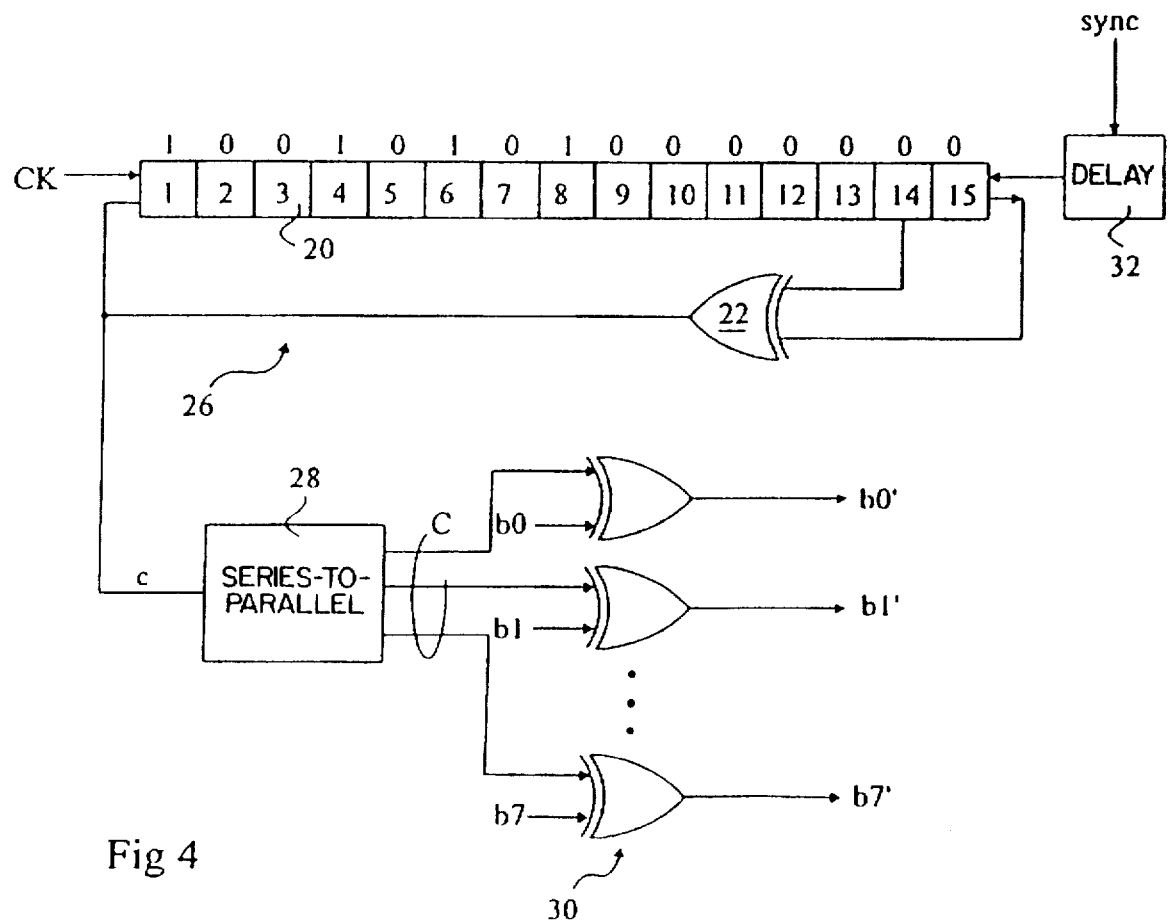
FIG. 4 shows a detailed embodiment of a circuit for removing energy dispersal according to the present invention.

FIG. 4 shows a detailed embodiment of the circuit 18' for removing energy dispersal. Polynomial counter 26, including a shift register 20 and an X-OR gate 22, is identical to the counter of FIG. 2. Shift register 20 is clocked by bit clock CK and is initialized via delay circuit 32. The output of X-OR gate 22, issuing series correction bits c, is supplied to series-to-parallel converter 28. Each of the eight X-OR gates 30 receives a corresponding bit b of the scrambled bytes and a corresponding bit of the correction byte C issued by series-to-parallel converter 28. The outputs of X-OR gates 30 supply the bits b' of each of the descrambled bytes.

The present invention has been described in the context of the processing of a transmission according to a specific standard, but it should be clear that the circuit for removing energy dispersal according to the invention applies to any parallel processing chain.

Of course, the present invention is likely to have various alterations, modifications and improvements which will readily occur to those skilled in the art. Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalents thereto.

What is claimed is:

1. A circuit for removing energy dispersal in the transmission of a data packet, the circuit including a polynomial counter for supplying, at a transmission rate of bits of the packet, correction bits to be respectively X-ORed with the bits of the packet, wherein the correction bits are all supplied through a single output line to a series-to-parallel converter having an output combined with successive parallel transmitted bits of the packet.

2. The circuit for removing energy dispersal according to claim 1, wherein the polynomial counter is initialized at the beginning of a packet.

3. The circuit for removing energy dispersal according to claim 2, the circuit being used in a packet processing chain upstream of a packet synchronization word detector and of a series-to-parallel converter of the processing chain, the polynomial counter receiving an initialization signal which is delayed, with respect to a synchronization detection signal, by a delay imposed between a synchronization detection and an occurrence of the beginning of a packet at an input of the circuit for removing energy dispersal.

4. A data processing chain for processing data packets, said processing chain including a synchronization circuit and a descrambler, the descrambler comprising:

a counter which receives a synchronization signal from said synchronization circuit and which outputs correction bits;

a series-to-parallel converter having an input for receiving said correction bits from said counter, wherein said series-to-parallel converter outputs correction bytes; and a gate for combining said correction bytes with said data packets.

5. The circuit of claim 4, said descrambler further comprising a device for delaying said synchronization signal before it is received by said counter.

6. The circuit of claim 5, wherein said counter comprises an X-OR gate having at least one input and an output for providing said correction bits; and a shift register which receives as inputs said delayed synchronization signal, a clock signal and said correction bits, and which outputs said at least one input of said X-OR gate.

7. The circuit of claim 4, wherein said gate comprises at least one X-OR gate.

8. A data packet transmission circuit comprising:

first converting means for converting incoming data packets from series to parallel and outputting a synchronization signal;

means for decoding said data packets; and means for processing said data packets;

said means for processing comprising:

means for outputting correction bits;

second converting means for converting said correction bits into correction bytes; and means for combining said correction bytes with said data packets.

9. The circuit of claim 8, wherein said processing means descrambles said data packets.

10. The circuit of claim 8, wherein said combining means comprises a plurality of X-OR gates.

11. The circuit of claim 8, wherein said second converting means comprises a series-to-parallel converter.

12. The circuit of claim 8, further comprising means for delaying said synchronization signal.

13. The circuit of claim 12, wherein said means for outputting correction bits comprises an X-OR gate having at least one input and an output for providing said correction bits; and a shift register which receives as inputs said delayed synchronization signal, a clock signal and said correction bits, and which outputs said at least one input of said X-OR gate.

14. The circuit of claim 8, wherein said means for outputting correction bits operates at a first frequency and said second converting means accepts said correction bits at said first frequency and outputs said correction bytes at a second frequency.

15. A method for processing data packets, the method comprising:

converting incoming data packets from serial form to parallel form;

outputting a synchronization signal in response to said converting step;

decoding said data packets; and processing said decoded data packets;

said processing step comprising:

delaying said synchronization signal;

producing correction bits in response to said delayed synchronization signal;

converting said correction bits to correction bytes; and combining said correction bytes with said decoded data packets.

16. The method of claim 15, wherein said processing step comprises descrambling said data packets.

17. The method of claim 15, wherein said processing step further comprises combining outputs of a shift register which accepts said delayed synchronization signal as an input to produce said correction bits.

18. The method of claim 15, wherein said combining step comprises X-ORing said correction bytes and said data packets.

* * * * *